United States Patent [19]

Aviram et al.

[11] Patent Number: 4,568,621

[45] Date of Patent: Feb. 4, 1986

[54] THERMAL TRANSFER PRINTING PROCESSES WITH ELECTROEROSION AND MATERIALS THEREFOR

[75] Inventors: Ari Aviram, Yorktown Heights; Mitchell S. Cohen, Ossining, both of N.Y.

[73] Assignee: International Business Machines Corporation, Armonk, N.Y.

[21] Appl. No.: 663,624

[22] Filed: Oct. 22, 1984

Related U.S. Application Data

[62] Division of Ser. No. 470,038, Feb. 28, 1983, abandoned.

[51] Int. Cl.[4] ........................ G03C 5/16; G01D 15/10; G01D 9/00

[52] U.S. Cl. ........................................ 430/5; 430/200; 346/76 R; 346/135.1; 346/163

[58] Field of Search ................... 430/5, 200, 346, 348; 346/76 R, 135.1, 163, 136; 250/318

[56] References Cited

U.S. PATENT DOCUMENTS

| | | | |
|---|---|---|---|
| 3,122,998 | 3/1964 | Raczynski et al. | 430/200 |
| 3,411,948 | 11/1968 | Reis | 346/135.1 |
| 3,441,940 | 4/1969 | Salaman et al. | 430/348 |
| 3,454,765 | 8/1969 | Hochberg | 430/200 |
| 3,476,937 | 11/1969 | Vrancken | 430/200 |
| 3,744,611 | 7/1973 | Montanari et al. | 346/76 R |
| 3,859,094 | 1/1975 | Franer et al. | 430/200 |
| 4,082,902 | 4/1978 | Suzuki et al. | 346/135.1 |

*Primary Examiner*—Richard L. Schilling
*Attorney, Agent, or Firm*—Sughrue, Mion, Zinn, Macpeak and Seas

[57] ABSTRACT

Processes for thermal transfer printing are disclosed which comprise electroerosion printing to produce an image bearing element and exposing the imaged element to irradiation so as to permit transfer of thermographic ink from an associated ink layer or ink-containing element onto an ink receiving substrate thus producing copies of the image carried by the image bearing element. Also, described are products for use in such processes.

8 Claims, 8 Drawing Figures

THERMAL TRANSFER PRINTING PROCESSES WITH ELECTROEROSION AND MATERIALS THEREFOR

This is a division of application Ser. No. 470,038, filed Feb. 28, 1983, now abandoned.

DESCRIPTION

TECHNICAL FIELD

The invention relates to thermal transfer printing processes utilizing electroerosion printing and materials for use in such processes.

Electroerosion printing is a technique for producing markings, such as, letters, numbers, symbols, patterns, such as, circuit patterns, or other legible or coded indicia on recording material in response to an electric signal which removes or erodes material from the surface of the recording material as the result of spark initiation or arcing.

The surface which is eroded or removed to provide such indicia on the recording material is usually a thin film of conductive material which is vaporized in response to localized heating associated with arcing which is initiated by applying an electric current to an electrode in contact with the surface of a recording material comprising the thin conductive film on a non-conductive backing or support. In the present state of the technology, the thin conductive film is usually a thin film of vaporizable metal, such as, aluminum. Electroerosion materials and processes are useful to produce directly, human readable images, photomasks, etc. For a number substrate and a hard surfaced metal film. Substrates of paper and various polymers have been employed with thicknesses on the order of 2 to 5 mil; as the erodible conductive layer metal films, such as, vapor deposited aluminum films of a thickness on the order of 400 Å to 10,000 Å have been utilized. For details on materials heretofore used in electroerosion printing, see U.S. Pat. No. 4,082,902, Suzuki, and U.S. Pat. No. 4,086,853, Figov.

While the imaged electroerosion materials produced by electroerosion printing as described are useful in themselves and are capable of providing machine or human readable graphics, it is desirable to expand the utility of such imaged sheets to permit their use in generating copies, e.g., copies of improved esthetic appearance or readability or copies on paper of higher quality than is normally used in electroerosion printing; and it is also desirable to expand the use of materials imaged by electroerosion into other areas, such as, the printing of multicolor indicia on an image receiving sheet, and to permit the use of a tape or ribbon form of the electroerosion material in a typewriter-like device, as well as in other related applications.

PRIOR ART

Thermographic transfer printing processes are known as exemplified in U.S. Pat. Nos. 3,122,998, Raczynski et al, 3,384,015, Newman, and 3,736,873, Newman. Raczynski broadly describes the transfer of an infrared responsive ink from a supply sheet to a copy sheet by assembling the two in contact with an original and exposing the assemblage to infrared (radiant energy) to cause ink from the supply sheet to transfer selectively to the copy sheet. Newman '015 describes specific thermographic materials for improving thermographic transfer processes of the general kind described in the Raczynski patent. Newman '873 describes a thermographic planographic printing plate incorporating a special plastic film foundation.

Other representative thermographic and electrothermographic processes and materials are disclosed in U.S. Pat. Nos. 3,441,940, Salaman et al, 3,744,611, Montanari et al, and 3,792,266, Gundlach.

For basic disclosures of electroerosion processes and materials refer to the above-cited Suzuki and Figov patents.

None of the patents discussed or mentioned above pertains to the use of electroerosion processing or the unique integration of electroerosion and thermographic processing and material as is contemplated in our invention.

SUMMARY OF THE INVENTION

In accordance with the present invention, it has been found that graphic reproductions or copies of an electroerosion imaged original can be produced by a unique coaction of electroerosion and thermographic processing. In particular by using an electroerosion recording material having a support which is capable of transmitting radiant energy, especially light rich in infrared energy, and associating with the imaged electroerosion recording material an element containing radiation responsive ink, it has been found that images recorded on the electroerosion material may be copied onto a variety of image receiving substrates.

DETAILED DESCRIPTION OF THE INVENTION

Figure 1:
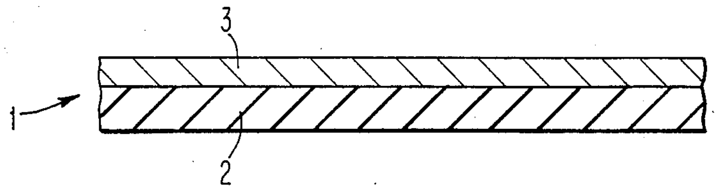
FIG. 1 of the drawing is a cross-sectional view of a basic electroerosion recording material used in the process of the invention.

The present invention is concerned with printing processes which rely upon a unique coaction of electroerosion printing and thermal transfer printing.

According to the invention, printing may be carried out on any suitable copy sheet or receiving sheet or other image-receiving substrate by providing an electroerosion recording material which comprises a radiant energy transmitting support and a layer of radiant energy reflecting, conductive material on the support. The conductive material must be capable of being removed by evaporation during electroerosion recording. In the most usual situation the radiant energy reflecting, conductive material is a thin layer of aluminum deposited by sputtering or vacuum evaporation. The foregoing electroerosion material is then subjected to electroerosion imaging. This produces areas where the radiant energy reflective, conductive material is removed, and radiant energy transmissive pathways, are opened through the radiant energy transmissive support. Before or after electroerosion imaging, the electroerosion recording material is overlaid on or contacted with an ink-containing layer or element. Where the term ink is used in this description any thermographically transferable imaging medium is contemplated, including varicolored media, colorless media, etc. The ink incorporated in this layer or element is non-transferable at normal ambient conditions as are encountered during storage, handling and the like. However, the ink is selected so that, upon exposure to radiant energy, it becomes flowable and transferable onto a copy sheet or image receiving sheet or substrate which is placed in contact with the ink while it is in the transferable state. Next, while in contact with a copy sheet or image receiving sheet or substrate, the assembly is exposed to radiant energy, usually light which is rich in infrared energy. Upon irradiation and thermographic transfer of ink from irradiated areas of the ink layer or element to the copy sheet or image receiving sheet or substrate, an image is produced on the image receiving substrate which corresponds to the electroerosion recorded image.

According to this invention, excellent copies may be made from electroerosion recorded elements onto plain paper, thus improving the quality of the original, thereby upgrading esthetically the quality of the graphics from that which is produced when using economical, but esthetically unattractive, electroerosion paper. The invention may also be employed to produce multicolored foils of plastic, aluminum, etc., and may also be used in an electroerosion typewriter-like device to produce imaged substrates.

In the process and materials of this invention any support material may be utilized in the electroerosion recording material provided that it is sufficiently transmissive with respect to radiant energy, such as, light rich in infrared; thus, upon irradiation from one side of such a support sufficient energy is transferred to the other side so that a radiation responsive or sensitive ink may be changed from a non-transferable to a transferable condition. For the electroerodible layer applied to the support any suitable material may be utilized provided that it is sufficiently conductive and erodible under electroerosion printing conditions to allow for the necessary imaging of the electroerosion material and provided that it is also substantially impermeable to and reflective of the radiant energy used in the process, e.g., infrared radiation.

As the support material a polyester is preferred. For example a 2 mil thick film of polyester (MYLAR, E.I. du Pont de Nemours and Company). The preferable electroerodible layer is an aluminum film which may be applied by conventional techniques such as sputtering or vacuum evaporation. An aluminum film thickness of from about 400–500 Å is satisfactory.

A cross-section of the basic electroerosion material is illustrated in FIG. 1 of the drawing wherein the electroerosion recording material 1 is shown to comprise a radiant energy transmitting support 2 which may be transparent polyester or the like and a thin film of electroerodible material 3 such as a film of aluminum metal.

Figure 2:
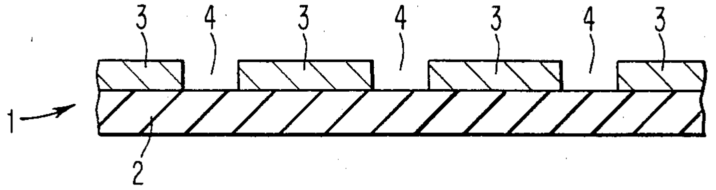
FIG. 2 is a cross-sectional view of the basic electroerosion material of FIG. 1 after imaging.

As will be seen with reference to FIG. 2 of the drawing the electroerosion recording material of FIG. 1 may then subjected to electroerosion printing to evaporate portions of the electroerodible layer 3, and to expose image-wise in areas 4 the underlying support 2. Processes for carrying out electroerosion recording are known and comprise contacting the electroerodible surface with one or more writing stylus(i) and applying a voltage of from 30 to 60 volts to evaporate the erodible layer in those areas where imaging is desired.

Next, the imaged electroerosion recording material, as illustrated in FIG. 2, is coated with a radiant energy responsive, thermographic ink 5. Alternatively, as shown in FIG. 4, the electroerosion imaged material of FIG. 2 may be overlaid with a discrete element 6 which contains a radiant energy responsive thermographic ink.

Figure 3:
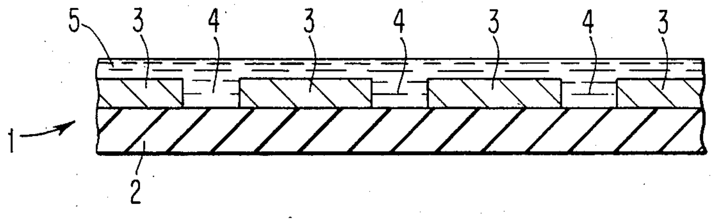
FIG. 3 is a cross-sectional view of the imaged basic electroerosion material of FIG. 2 after the application of an ink layer over the upper or imaged surface thereof.
Figure 5:
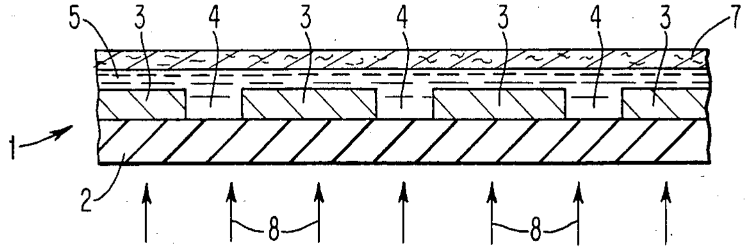
FIG. 5 is a cross-sectional view of the material of FIG. 3 shown in contact with a copy sheet or image receiving sheet or substrate.
Figure 7:
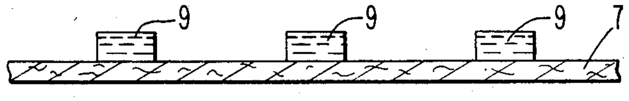
FIG. 7 is a cross-sectional view of a copy sheet or image receiving sheet or substrate showing imaged areas which may be produced by processing the assemblied of FIGS. 5, 6 and 8.

Next, as illustrated in FIG. 5, the inked material of FIG. 3 is overlaid with a copy sheet or image-receiving sheet or substrate 7. When this assembly is exposed to radiant energy, such as, light which is rich in infrared radiation, as indicated by the arrows 8, the energy is selectively transmitted to ink layer 5 in the imaged areas 4, but is reflected in the nonimaged areas 3. As a result the ink in layer 5 in the regions above imaged areas 4 becomes flowable and transferable to the receiving sheet 7. The receiving sheet 7 may thereafter be separated to provide a discrete copy as shown in FIG. 7 composed of the receiving sheet 7 and transferred ink images 9. The image transferred to the receiving sheet is equivalent to the image seen by viewing the electroerosion recording film from the direction of the exposing source of radiant energy, e.g., an infrared source.

Figure 4:
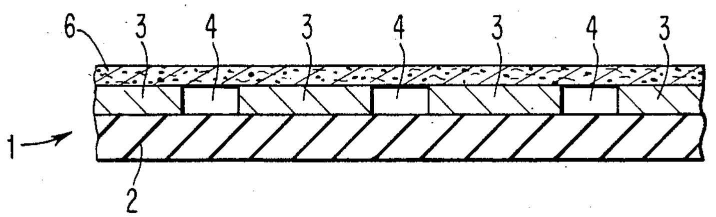
FIG. 4 is a cross-sectional view of the imaged electroerosion recording material of FIG. 2 having overlaid on the imaged surface thereof an ink-containing element.
Figure 6:
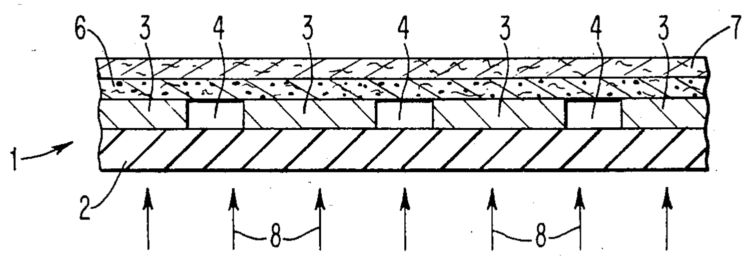
FIG. 6 is a cross-sectional view of the material of FIG. 4 shown in contact with a copy sheet or image receiving sheet or substrate.

Similarly, as illustrated in FIG. 6, where a discrete ink-containing element 6 is overlaid on the imaged electroerosion recording material as shown in FIG. 4, and a copy sheet or image-receiving sheet 7 is overlaid on the ink-containing element 6, exposure of the assembly to radiant energy as indicated by arrows 8 will generate a copy by thermographic ink transfer, the copy being as illustrated in FIG. 7.

Figure 8:
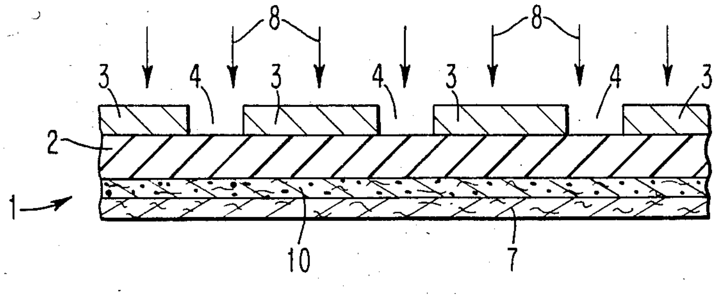
FIG. 8 is a cross-sectional view of an imaged electroerosion material shown in association with an ink-containing element representing an alternative embodiment of the invention.

In the two types of thermographic/electroerosion printing processes and materials illustrated in FIGS. 3–7, the ink-containing layer or element is shown to have been placed on the side of the electroerodible layer 3 which usually is a thin film of aluminum. It is believed that higher resolution should be attainable if the ink-containing layer or element is thus applied to aluminized side. However, the invention may also be practiced in a number of embodiments wherein the ink-containing layer or element is located on the side of support 2 away from the electroerodible (aluminum) layer. Such an embodiment is illustrated in FIG. 8 of the drawing which shows an assembly composed of an electroerosion material 1 comprising a transparent support 2 and an electroerodible layer 3 which has been imaged in areas 4. An ink-containing element 10 is interposed between support 2 and copy sheet or image receiving sheet or substrate 7. Upon exposure to radiation as indicated by arrows 8, radiant energy responsive ink (thermographically transferable ink) in element or layer 10 is rendered flowable or transferable and an image is transferred to receiving sheet 7 to produce a copy as shown in FIG. 7.

In addition to making high quality copies of electroerosion imaged originals, the foregoing inventions could be utilized in several other practical applications, for example, as noted above, the inventions may be used in the production of multicolored foils. Using intermediate sheets impregnated with inks of different colors, colored foils can be generated. If different electroeroded primary sheets are used, each one in conjunction with an intermediate sheet containing a differently colored ink but with the same receiving sheet, for example a transparent polyethylene terephthalate foil, a series of colored images may be applied to the foil. The principles of the invention may also be applied to provide a typewriter-like system wherein an electroerosion recording material and ink element assembly in tape or ribbon form are sequentially passed through an electroerosion writing station and to a printing station, i.e., a station at which the electroerosion imaged material is exposed to radiant energy thereby transferring characters or other images to a receiving sheet which is in contact with the ink-containing element.

The invention has been described above and illustrated in the drawings in terms of the basic, functional elements (layers, sheets, substrates, etc.) for carrying out the inventions. Other elements, e.g., intermediate layers, sheets or the like could also be incorporated in the processes and products of the inventions without departing from the spirit of our invention. For instance in the following example, a thin hard transparent layer is incorporated between the polyester support and the electroerodible aluminum layer to improve the quality of the electroerosion imaging step. This layer, however, does not interfere with or alter the essential functioning of the described inventions.

EXAMPLE

A sheet of transparent polyethylene terephthalate provided with a thin hard intermediate layer was coated with an aluminum film to form a basic electroerosion recording sheet. The sheet was then written upon by electroerosion recording according to standard practice. Next, the imaged sheet of electroerosion recording material was contacted with the uninked face of a PET typewriter ribbon. This assembly was then placed in contact with a sheet of plain white bond paper. The resulting assembly was then inserted into a standard projection transparency machine and exposed to intense infrared light. Good thermographic printing transfer was achieved and a legible copy of the electroerosion image was obtained on the bond paper.

Various other copy sheets, receiving sheets, or other types of ink-receiving substrates could be substituted for the bond paper in the foregoing example or in the other embodiments of the inventions described above.

Only the embodiment of the invention set forth in the above example has been carried out, but the other described embodiments are believed to be set forth with sufficient particularity so that those of ordinary skill in the art will be readily enabled to practice these inventions.

While the invention has been described in connection with certain preferred embodiments, other adaptations and embodiments of the invention may be made by those of skill in the art without departing from the spirit of the invention or the scope of the following claims.

Having thus described our invention, what we claim as new, and desire to secure by Letters Patent is:

1. A continuous process for printing comprising providing a continuous sheet in tape or ribbon form of electroerosion recording material comprising a radiant energy transmissive support and, on said support, a layer of conductive material which is substantially impermeable to and reflective of radiant energy, said conductive material being capable of being removed during electroerosion recording, to an electroerosion writing station; carrying out electroerosion writing on said recording material to selectively remove portions of said conductive material thus forming imaged areas in said electroerosion recording material, which imaged areas provide light transmissive paths through said transparent support; forming an assembly of said continuous sheet of electroerosion recording material either before or after carrying out electroerosion recording with an ink-containing layer or element positioned opposite the side of said support on which said layer of conductive material is positioned, said ink being substantially non-transferable at normal ambient conditions, but being responsive to radiant energy so that said ink, upon exposure to radiant energy, becomes flowable and is capable of being transferred to a ink-receiving member, transporting said assembly to a printing station and while having said ink-containing layer of said assembly in contact with an ink-receiving substrate, exposing said assembly to radiant energy, said energy being directed onto said assembly from the side of the assembly opposite to the side on which said ink-receiving substrate is located, to cause said ink to become flowable selectively in areas overlaying said imaged areas, and causing said ink to be transferred to said ink receiving substrate producing ink images corresponding to the imaged areas of said electroerosion recording material.

2. The method of claim 1 wherein said support comprises a radiant energy transmissive polymer.

3. The method of claim 2 wherein said layer of conductive material comprises a thin film of electroerodible aluminum.

4. The method of claim 3 wherein said radiant energy comprises infrared radiant energy.

5. A continuous process for printing comprising providing a continuous sheet in tape or ribbon form of electroerosion recording material comprising a radiant energy transmissive support and, on said support, a layer of conductive material which is substantially impermeable to and reflective of radiant energy, said conductive material being capable of being removed during electroerosion recording, to an electroerosion writing station; carrying out electroerosion writing on said recording material to selectively remove portions of said conductive material thus forming imaged areas in said electroerosion recording material, which imaged areas provide light transmissive paths through said transparent support; forming an assembly of said continuous sheet of electroerosion recording material either before or after carrying out electroerosion recording with an ink-containing layer or element positioned in overlaying relationship to the layer of conductive material, said ink being substantially non-transferable at normal ambient conditions, but being responsive to radiant energy so that said ink, upon exposure to radiant energy, becomes flowable and is capable of being transferred to a ink-receiving member, transporting said assembly to a printing station and while having said ink-containing layer of said assembly in contact with an ink-receiving substrate, exposing said assembly to radiant energy, said energy being directed onto said assembly from the side of the assembly opposite to the side on which said ink-receiving substrate is located, to cause said ink to become flowable selectively in areas overlaying said imaged areas, and causing said ink to be transferred to said ink receiving substrate producing ink images corresponding to the imaged areas of said electroerosion recording material.

6. The method of claim 5 wherein said support comprises a radiant energy transmissive polymer.

7. The method of claim 6 wherein said layer of conductive material comprises a thin film of electroerodible aluminum.

8. The method of claim 7 wherein said radiant energy comprises infrared radiant energy.

* * * * *